Oct. 19, 1948.  S. E. TWAROSKI  2,451,699
SUPPORT
Filed Sept. 28, 1945
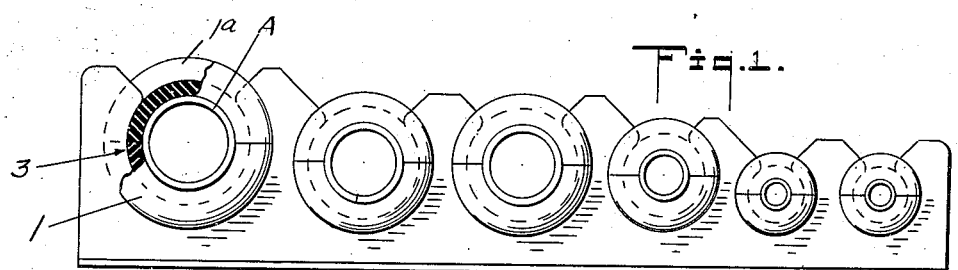
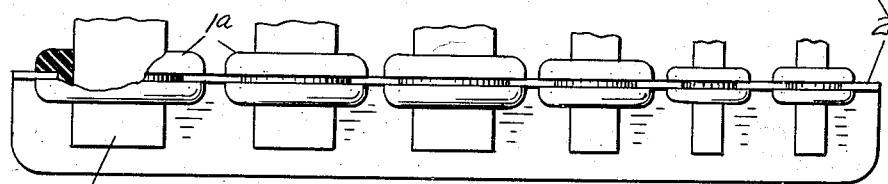
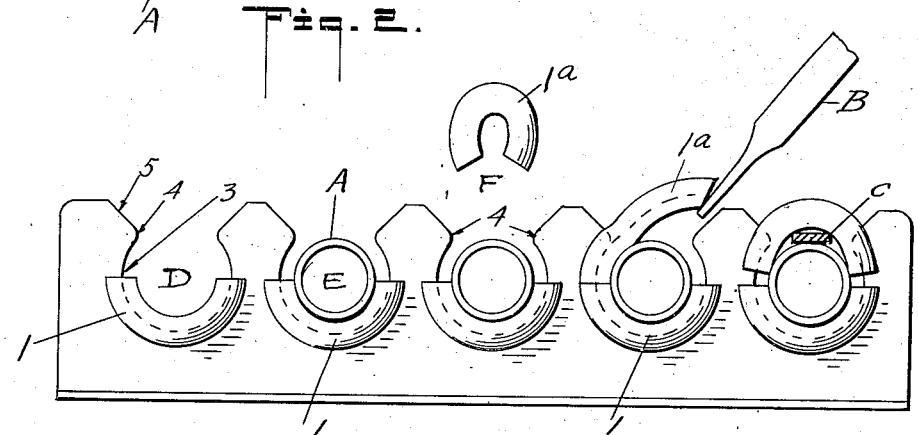
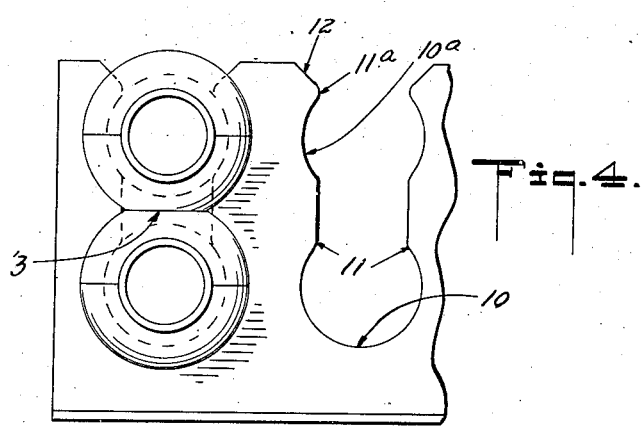
INVENTOR.
BY S. E. Twaroski
OO Martin.
ATTORNEY.

Patented Oct. 19, 1948

2,451,699

UNITED STATES PATENT OFFICE 2,451,699

SUPPORT

Stanley E. Twaroski, Los Angeles, Calif.

Application September 28, 1945, Serial No. 619,015

2 Claims. (Cl. 248—68)

The present invention relates to improvements in devices for supporting cylindrical objects, such as tubing, cables and the like.

In airplanes, particularly, the space available for supporting fuel pipes, oxygen and hydraulic tubing and cables is often so limited and difficult to reach that the mounting of such objects becomes quite a task. Various devices for facilitating such mounting have been successfully introduced and they render excellent service so long as they remain undisturbed in position. They do, however, include some very small locking elements which, in mounting and demounting, are easily bent, displaced and lost and, if not at the time replaceable, leave the objects unsupported and in danger of being damaged or causing damage.

It is the object of my invention to provide supporting devices of the character referred to which include no such separate locking elements but which are so shaped and proportioned that they may be readily assembled to anchor the objects solidly in position and as easily taken apart whenever it is desired to remove the objects therefrom.

Devices embodying the features of my invention are illustrated in the accompanying drawings; hereinafter described in detail; and particularly set forth in the claims hereto appended.

In the drawings:

Fig. 1 is a side elevational view of a device embodying the invention;

Fig. 2 is a substantially corresponding plan view of the device;

Fig. 3 illustrates progressively the manner in which the parts of my invention are assembled and again taken apart; and Fig. 4 is a fragmentary view illustrating a somewhat modified form of the invention.

The structure of my invention, in the form illustrated in the drawings, comprises a grommet-shaped sleeve, which is centrally split to form two identical half-portions 1, 1$^a$ for insertion into a recess of a suitable support bracket 2 to maintain objects such as tubing A, rods, or wire harness in position therein. The sleeve is made from rubber which is so soft that the two parts thereof may be freely compressed and bent into the shapes required for insertion and removal of the sleeve parts, substantially as will not be described. It may also be made in sizes to fit the objects to be supported, as indicated in Fig. 1.

The recess of the support bracket is circular at the bottom, as indicated at 3, and the entrance thereto is contracted at 4 until the width thereof is merely sufficient to pass the object A therethrough. The edges of the recess, extending from the neck in this manner formed, are outwardly flared, substantially as indicated at 5 and the outer and inner corners of the flared portion are well rounded in order that the sleeve parts may be readily mounted and removed without danger of damaging these parts. In other words, the groove may be said to be cuspidor-shaped. As the first step in the operation of mounting the object A in position, the sleeve portion 1 is first pushed into the bottom of the recess, substantially as shown at D, in Fig. 3, care being taken that it is seated fairly squarely therein. The object A is then placed in the seat within this sleeve portion, as indicated at E. The other sleeve portion 1$^a$ is thereupon sufficiently compressed between the fingers of the operator, substantially as indicated at F, to be pushed through the neck 4 of the recess and forced into position on the sleeve part 1. Because of the softness and resilience of the sleeve rubber, this operation is easily performed by anyone assigned to this assembling job.

But while it is such an easy matter in this manner to lodge the object within the recess, it is not possible again to remove it therefrom by pulling on or by pressure against the object. However, when properly done, it is no more difficult to remove the object than it is to seat it. It is merely required to pull one end of the upper sleeve portion out of the groove or, if not readily accessible to slip the end of a screw-driver B, or any other flat pointed part available, between two of the abutting surfaces of the sleeve portions and gently to pry this end of the upper sleeve portion through the neck of the recess, substantially to the position indicated in Fig. 3, whereupon it is readily withdrawn. Or, in case for some reason it is not found convenient so to enter the tool between the abutting sleeve surfaces it is possible, by placing the end of the tool under the inner edge of the upper sleeve portion, substantially as indicated at C in Fig. 3, to lift this sleeve portion out of the neck in the same manner that it was inserted therethrough in the first place.

While I have above described the sleeves as being centrally split to form two separate half-portions, I wish it understood that, where it is possible to insert the objects through the sleeves from one end thereof, it is also possible to use sleeves which have not been so split, by first seating the sleeves in the grooves of the bracket and then pushing the objects endwise therethrough. But I have found the split sleeve construction much more convenient under all ordinary working conditions.

I am aware that other tube supports are in use, which employ soft rubber grommets seated in recesses of support brackets somewhat similar to the present structure. But in such devices as have come to my notice the grommets are freely seated in the bracket recesses and additional members are required to lock the grommets in position therein. Such additional members are necessarily very small, apt to become bent and easily mislaid and lost in places where devices of this character are mostly used.

In cases where the anchoring spaces for the support brackets are very limited, it is possible to mount additional objects within each bracket recess by merely modifying the shape of the recess. Such combination is illustrated in Fig. 4. It is noticed that the lower seat 10, and neck 11 remain as above described, and that it is merely a matter of forming an identical seat 10a and neck 11a on top of the former. The flared outer edges 12 may also remain unchanged. In combination devices of this kind, it may be well to slightly flatten the abutting edges of the upper and lower sleeves, substantially as indicated at 13 in order to facilitate correct positioning of the sleeve parts.

It is to be understood that the sizes of the recesses and of the sleeves seatable therein depend entirely upon the size of tubing or cable to be anchored therein and may be varied to accommodate objects of different sizes within a single support bracket. It is further understood that modifications of shapes, sizes and arrangements may be embodied within the scope of the claims hereto appended.

I claim:

1. In a device for supporting cylindrical objects, a support bracket made from sheet material and having sunk in the edge thereof one or more grooves, each groove having an enlarged circular bottom contracted at the upper portion thereof to form a neck, the groove having a second circular enlargement above said neck and a contraction at the upper part thereof to form a second neck, both necks being of a width snugly to pass the objects to be supported, in combination with soft resilient grommet-shaped centrally split sleeves seatable in said circular enlargements firmly to encompass the objects to be supported.

2. In a device for supporting cylindrical objects, a support bracket made from sheet material and having sunk in the edge thereof one or more grooves, each groove having an enlarged circular bottom portion contracted at the upper portion thereof to form a neck, the groove having a second circular enlargement above said neck and a contraction at the upper portion thereof to form a second neck, both necks being of a width snugly to pass therethrough the objects to be supported, in combination with soft resilient centrally split sleeves having each an annular groove intermediate its side surfaces, the sleeves being seatable within said enlargements with their groove bottoms fittingly seated therein and the groove sides firmly gripping the bracket sides and with their central openings firmly encompassing the objects, the adjoining edges of the sleeves being flattened better to align one sleeve with the other.

STANLEY E. TWAROSKI.

REFERENCES CITED

The following references are of record in the file of this patent:

UNITED STATES PATENTS

| Number | Name | Date |
| --- | --- | --- |
| 770,278 | Fletcher | Sept. 20, 1904 |
| 1,125,064 | Connell | Jan. 19, 1915 |
| 1,129,782 | Bissell et al. | Feb. 23, 1915 |
| 1,429,776 | Robinson | Sept. 19, 1922 |
| 1,804,416 | Hathaway | May 12, 1931 |
| 2,291,430 | Ingersoll | July 28, 1942 |
| 2,356,318 | Hayman | Aug. 22, 1944 |
| 2,394,240 | Harrison | Feb. 5, 1946 |

FOREIGN PATENTS

| Number | Country | Date |
| --- | --- | --- |
| 555,302 | Great Britain | Aug. 16, 1943 |
| 605,213 | Germany | Nov. 7, 1934 |